(12) United States Patent
Hsu et al.

(10) Patent No.: US 7,009,812 B2
(45) Date of Patent: Mar. 7, 2006

(54) MAGNETIC TRANSDUCER FOR PERPENDICULAR MAGNETIC RECORDING WITH SINGLE POLE WRITE HEAD WITH TRAILING SHIELD

(75) Inventors: Yimin Hsu, Sunnyvale, CA (US); Quang Le, San Jose, CA (US); Hin Pong Edward Lee, San Jose, CA (US); James Lamar Nix, Gilroy, CA (US); Aron Pentek, San Jose, CA (US); Kurt Rubin, San Jose, CA (US); Neil Smith, San Jose, CA (US); Nian Xiang Sun, Sunnyvale, CA (US); Walter Eugene Weresin, San Jose, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 69 days.

(21) Appl. No.: 10/675,046

(22) Filed: Sep. 29, 2003

(65) Prior Publication Data

US 2005/0068671 A1    Mar. 31, 2005

(51) Int. Cl.
*G11B 5/147* (2006.01)
(52) U.S. Cl. .................................................. 360/126
(58) Field of Classification Search ................ 360/126
See application file for complete search history.

(56) References Cited

U.S. PATENT DOCUMENTS

| 4,731,157 A | 3/1988 | Lazzari |
| RE33,949 E | 6/1992 | Mallary et al. |
| 5,196,976 A | 3/1993 | Lazzari |
| 5,408,373 A | 4/1995 | Bajorek |
| 5,550,691 A | 8/1996 | Hamilton |
| 6,513,228 B1 * | 2/2003 | Khizroev et al. ......... 29/603.14 |
| 6,594,112 B1 * | 7/2003 | Crue et al. .................. 360/126 |
| 6,687,084 B1 * | 2/2004 | Takahashi et al. .......... 360/126 |
| 6,785,092 B1 * | 8/2004 | Covington et al. ......... 360/126 |
| 6,809,899 B1 * | 10/2004 | Chen et al. ................. 360/125 |
| 6,816,339 B1 * | 11/2004 | Litvinov et al. ............ 360/125 |
| 6,836,957 B1 * | 1/2005 | Kobayashi ............... 29/603.16 |
| 6,842,313 B1 * | 1/2005 | Mallary ..................... 360/319 |
| 2002/0034043 A1 | 3/2002 | Okada et al. |
| 2002/0036871 A1 | 3/2002 | Yano et al. |
| 2002/0170165 A1 | 11/2002 | Plumer et al. |
| 2002/0176214 A1 | 11/2002 | Shukh et al. |
| 2003/0043513 A1 | 3/2003 | Lin |
| 2003/0117749 A1 | 6/2003 | Shukh et al. |
| 2003/0227714 A1 | 12/2003 | Parker et al. |

OTHER PUBLICATIONS

M.Mallory, et al. "One Terabit per Square Inch Perpendicular Recording Conceptual Design," IEEE Transactions on Magnetics, vol. 38, no. 4, Jul. 2002, pp. 1719ff.

* cited by examiner

*Primary Examiner*—A. J. Heinz
(74) *Attorney, Agent, or Firm*—G. Marlin Knight

(57) ABSTRACT

The invention is a magnetic transducer with separated read and write heads for perpendicular recording. The write head has a trailing shield that extends from the return pole piece toward the main pole piece to form the write gap at the air-bearing surface. One embodiment of the trailing shield is a two part structure with a pedestal and a much smaller tip that confronts the main pole piece at the gap. In one embodiment a sink of non-magnetic, electrically conductive material is disposed in the separation gap between the read head and the flux bearing pole piece. The sink is preferably made of copper and does not extend to the ABS.

21 Claims, 5 Drawing Sheets

MAGNETIC TRANSDUCER FOR PERPENDICULAR MAGNETIC RECORDING WITH SINGLE POLE WRITE HEAD WITH TRAILING SHIELD

FIELD OF THE INVENTION

The invention relates to thin film magnetic transducers for perpendicular recording and more particularly to the inductive write head portion of the transducer and even more particularly to the design of the pole pieces for the inductive write head.

BACKGROUND OF THE INVENTION

In a typical prior art magnetic disk recording system a slider containing magnetic transducers for reading and writing magnetic transitions flies above the disk while it is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive.

In a disk drive using perpendicular recording the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The shape and size of the main pole and any shields are the primary factors in determining the track width.

In U.S. Pat. No. RE33,949 to Mallary, et al. a head for perpendicular recording is described which includes a "downstream shield" which is separated from the write pole by a small gap. The arrangement is said to intercept most of the downstream fringing flux by the flux return section so that the flux return section acts as a magnetic shield. The interception of the downstream fringing flux by the magnetic shield reduces the undesirable effect of reversing, or weakening, a previously recorded bit of information. The air-bearing surface (ABS) face of the shield is designed to be many times as large as the face of the main (write) pole piece so that the density of the flux from the main pole tip is sufficient to effect a vertical recording while the density of the flux passing into the downstream magnetic shield is low and a previously recorded pattern is not reversed.

FIG. 1 illustrates a prior art head 26 for perpendicular recording and the associated media 27. The head is described in an article by M. Mallary, A. Torobi and M. Benakli published in IEEE Transactions on Magnetics, vol. 38, no. 4, July 2002. The head 26 has a trailing shield pole 33 and side shields (not shown). The magnetoresistive sensor 31 is flanked by shields 36, 37. This head is workable with a leading magnetoresistive head structure because two pancake coils 35A, 35B are used to ensure that the read head shield 36 is at the same magnetomotive potential as the trailing shield pole 33 and the soft underlayer 29 of the medium 27. The flux paths are illustrated by lines 39 which show the write pole originating the flux at the ABS which then is divided between the trailing shield pole 33 and the read head shield 36 after passing through the hard ferromagnetic recording layer 28. A disadvantage of this design is that it requires two pancake coils. It also requires a relatively thick return pole which will have to be made of high moment material for the desirable high write field capability, and a very narrow throat height for that element. The figure also shows this design will result in write disturbance of the read shields.

Perpendicular magnetic recording is considered to be superior to longitudinal magnetic recording for ultra-high density magnetic recording. The increase demand for higher areal density has correspondingly led to increase demand to explore ways to reduce the width of the write pole piece, increase the write field strength, and improve the write field gradient. Experimental evidence and modeling have shown that a trailing shield single pole writer (SPT) design achieves a 4–5 dB media signal to noise advantage over writing with the trailing edge of an unshielded pole, increase in dHy/dx of the head field, reduce partial erasure, and improve saturation. These features improve transition sharpness (linear resolution) and permit higher coercive field media (improved stability).

SUMMARY OF THE INVENTION

The invention is a magnetic transducer with separated read and write heads for perpendicular recording. The write head has a trailing shield that extends from the return pole piece toward the main pole piece to form the write gap at the air-bearing surface. One embodiment of the trailing shield is a two part structure with a pedestal and a much smaller tip that confronts the main pole piece at the gap. In one embodiment a sink of non-magnetic, electrically conductive material is disposed in the separation gap between the read head and the flux bearing pole piece. The sink is preferably made of copper and does not extend to the ABS.

DETAILED DESCRIPTION OF THE INVENTION AND THE PREFERRED EMBODIMENTS

Figure 1:
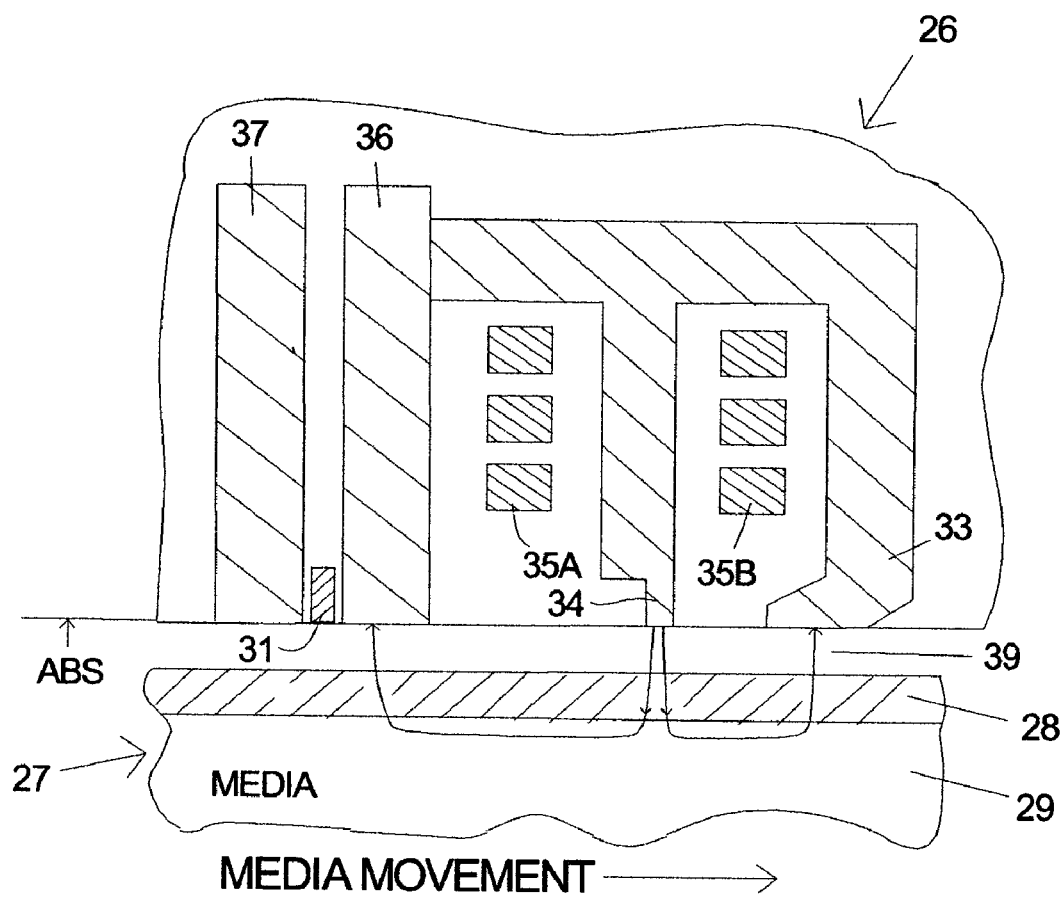
FIG. 1 is a symbolic illustration of a section of a prior art recording head and media for perpendicular recording taken perpendicular to the air-bearing surface.
Figure 2:
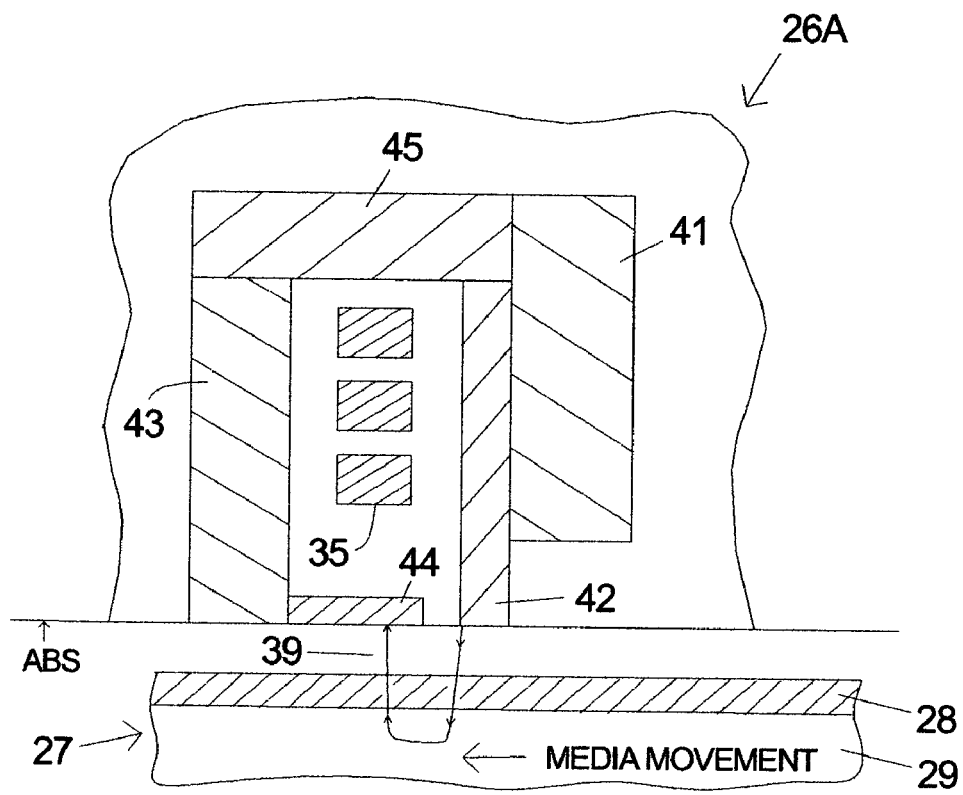
FIG. 2 is a symbolic illustration of a section of a recording head according to a first embodiment of the invention. The section taken is perpendicular to the air-bearing surface. The media for perpendicular recording is included in the view to aid in describing the functioning of the head.

FIG. 2 is a symbolic illustration of a section of a head 26A according to a first embodiment of the invention. The section is taken perpendicular to the ABS. This figure and the others included herein are not to scale, in part because the smaller components and spacings would be unclear. Places where the relative sizes and dimensions are significant will be noted if not known to those skilled in the art. The ABS is shown without a thin film protective overcoat which would normally be present in a production head. The term ABS as used herein means the plane as shown in the drawings without regard to whether an overcoat is present. The read sensor and its shields are not shown in FIG. 2, but could be located on either side of the write head. This design has a single coil 35. The yoke is composed of ferromagnetic pole pieces 41, 42, 43 and 46 and trailing shield 44. The trailing shield 44 can also be considered a pole piece. The movement of the magnetic recording medium is from the main pole piece 42 to the trailing shield 44, hence the label "trailing." Pole piece 41 provides the needed mass of ferromagnetic material for the main pole piece 42, but does not extend to the ABS. Only the small area of the main pole 42 appears at the ABS. The back of the yoke 45 (often called the "back gap") directly connects the pole pieces 42 and 41 to the return pole piece 43. The trailing shield 44 has a simple rectangular cross-section in this design, but other shapes are possible as will noted below. The trailing shield 44 extends from the ABS end of the return pole 43 toward the main pole 42. Without the trailing shield the write gap in this design is limited by the thickness of coil 35 which passes between the main pole piece 42 and the return pole piece 43. The trailing shield of the invention allows the length of write gap to be optimized independently from the coil parameters.

For a typical perpendicular head with a single pole writer and no trailing shield, the flux path at the ABS is from the main pole through the hard ferromagnetic recording layer into the soft underlayer of the media and back through the recording layer to the return pole. As shown in FIG. 2, with a design according to the invention the main flux path 39 returns to the trailing shield 44 which is closer to the main pole piece 42. The trailing shield 44 design achieves a better write field gradient and lower media noise. Three critical parameters in this design are 1) the gap between the main pole 42 and the trailing shield 44; 2) the ABS to soft underlayer spacing, and 3) the trailing shield thickness. The ABS to soft underlayer spacing is not a feature of the recording head, but rather is determined by the design of the storage device in which the head is employed.

Figure 3:
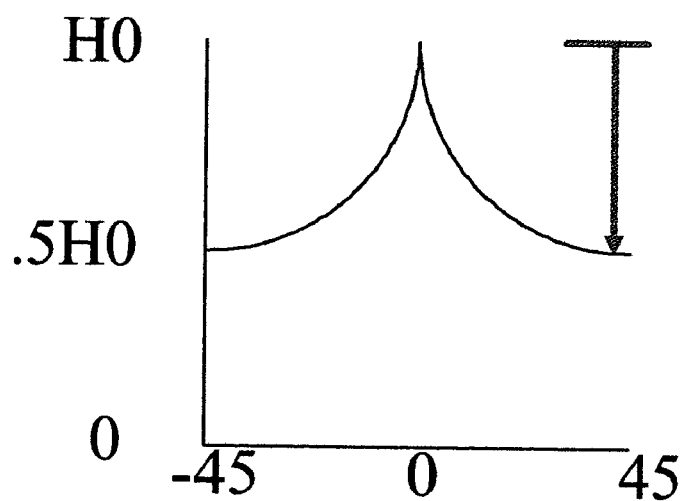
FIG. 3 is a plot of H-grain angle as a function of the main grain angle.

The improvements of the single pole trailing shield (SPT) design of the invention over the single pole (SP) design can be explained by Stoner-Wohlfarth model. FIG. 3 is a plot of H-grain angle as a function of the main grain angle. It can be seen that for a distribution of grain angles, increasing the angle between H and the mean grain angle can decrease the distribution of switching fields by ½ thus increasing the effective field by 2× and decreasing jitter.

The optimal field angle is achieved in the design when the distance from the ABS to the soft underlayer 29 is equal to the length of the write gap (the distance between the end of the trailing shield 44 and the main pole piece 42). The write field is decreased as the shield is brought closer to the write pole piece because part of the flux is increasingly shared between the soft underlayer of the media and the trailing shield. This problem is ameliorated by increasing the thickness of the trailing shield and bringing the flare point of the main pole piece 42 closer to the ABS. The flare point (not shown) is where main pole piece 42 begins to widen (in a top view) away from the ABS. The advantages of this head design are as follows:

1) Increased dH/dX
2) Reduced partial erasure
3) Improved saturation
4) Reduced media noise
5) Tilt field eases writing on S-W media.

To minimize write flux loss and still achieve the desired effect, the trailing shield thickness from the ABS into the head should be roughly equal to half the track-width of the main pole piece 42. As the track-width aggressively shrinks to achieve higher areal density, the fabrication of the trailing shield will be increasingly difficult. The final trailing shield thickness in particular is defined by either row or single slider lapping of the ABS. The lapping process terminates either using an electro-lapping-guide (ELGs) and/or the stripe height on the reader portion of the head as the criteria. This could cause curvature or damage to the shield as the design point calls for tight nanometer scale dimension. One solution to this problem is a two step design for the trailing shield. Rather than one continuous trailing shield, a "notched" trailing shield is broken into two components: a pedestal (body) and a tip. The trailing shield tip fabrication remains critical, but the trailing shield pedestal requirements are relaxed. This two step design will offer more structural strength during lapping, relax lithography, and allow the trailing shield pedestal to be curved back to the return pole.

Figure 4:
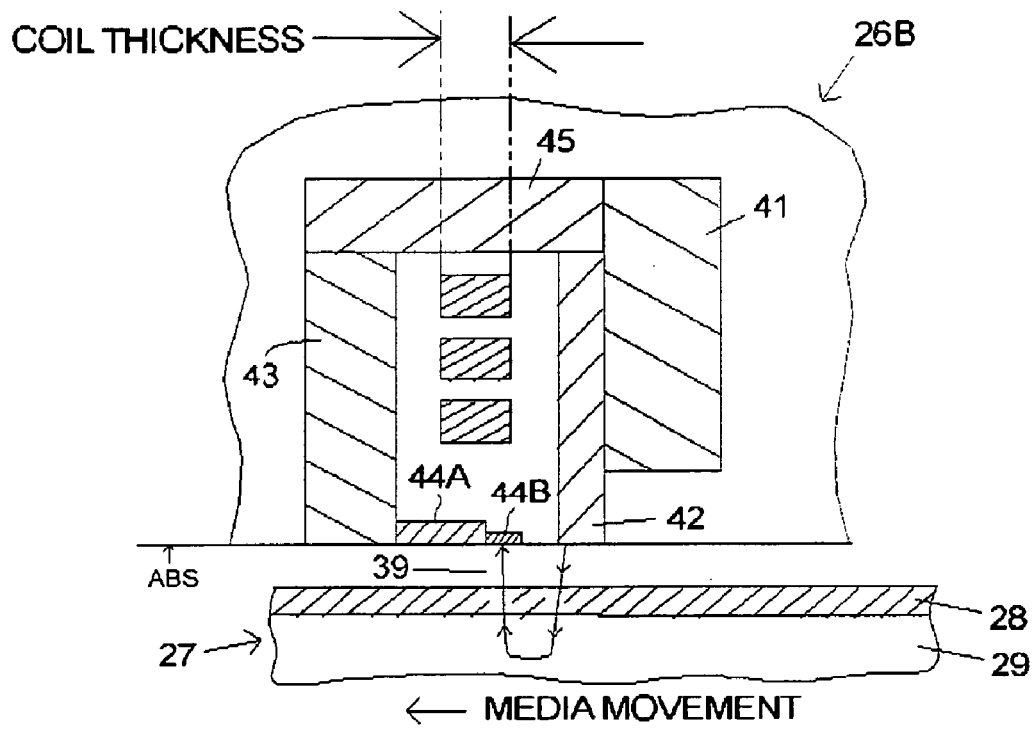
FIG. 4 is a symbolic illustration of a section of a recording head according to a second embodiment of the invention which includes a notched trailing shield. The section taken is perpendicular to the air-bearing surface. The media for perpendicular recording is included in the view to aid in describing the functioning of the head.
Figure 5:
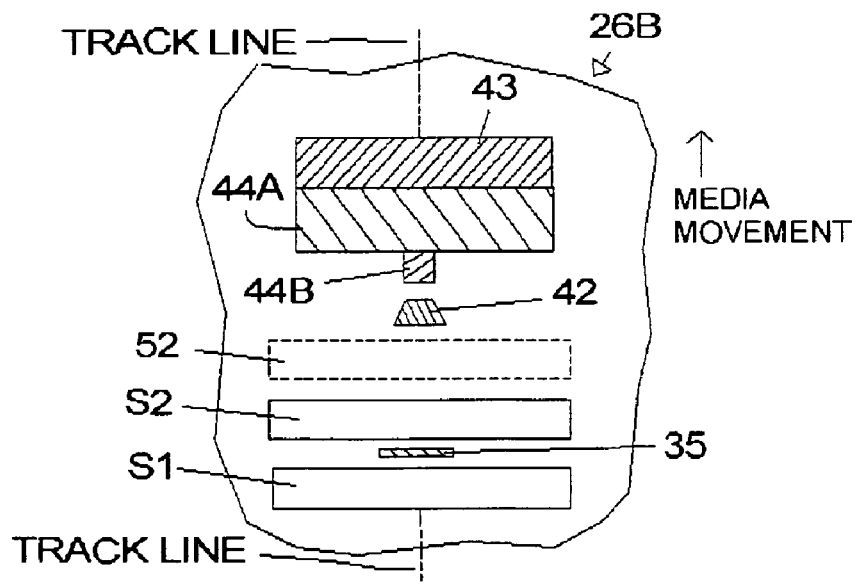
FIG. 5 is a symbolic illustration of the air-bearing surface of a recording head according to a second embodiment of the invention which includes a trailing shield.

FIG. 4 is a symbolic illustration of a section of a recording head 26B according to a second embodiment of the invention which includes a notched, two part trailing shield. The notched design has a larger maximum write field than can be achieved with the notched design. Finite element modeling has shown an 8–10% improvement in the write field. The section taken is perpendicular to the air-bearing surface. The two part trailing shield includes a pedestal 44A and a tip 44B which each have rectangular cross-sections. The tip 44B has the smaller cross-section giving the combination a "notched" appearance. FIG. 5 is an illustration of an ABS view of the recording head 26B. The cross-track width of the tip 44B is comparable to the width of the main pole piece 42 at the ABS, but the width of the pedestal 44A is much larger than the width of the tip.

The height of the tip 44B in the y-direction (orthogonal to the ABS) is preferably equal to about four write gaps to minimize write flux lost from the write pole piece to the shield. The width of tip 44B in the x-direction (cross-track) is equal to approximately one-half the recording track width of the main pole piece 42 to minimize write flux lost and still achieve desired effect. With the pedestal 44A being further separated from the write pole, its fabrication will be relaxed, allowing its thickness from the ABS (y-direction) to be less critical than the tip 44B. This allows the pedestal 44A to be curved or straight where the pedestal 44A is stitched back to the return pole piece 43. In addition, this allows easier fabrication of the tip, minimizes damage to tip and relaxes the tip lithography. A non-magnetic metal such as Rh or Ru functioning as a seed layer and write gap material can be left intact without the need for seed-layer removal. Since the write gap thickness control and the placement of the tip are critical parameters in this design, using a metal gap can minimize damage to the tip if no seed-layer removal step is required.

A straight or curved pedestal stitch back to the return pole is possible. Since only the tip fabrication is critical to minimize write flux lost, this design approach allows for pedestal to be curved. A curved pedestal is preferred. Also the tip can consist of high moment material to minimize saturation at the write gap while the pedestal can be lower moment.

Figure 6:
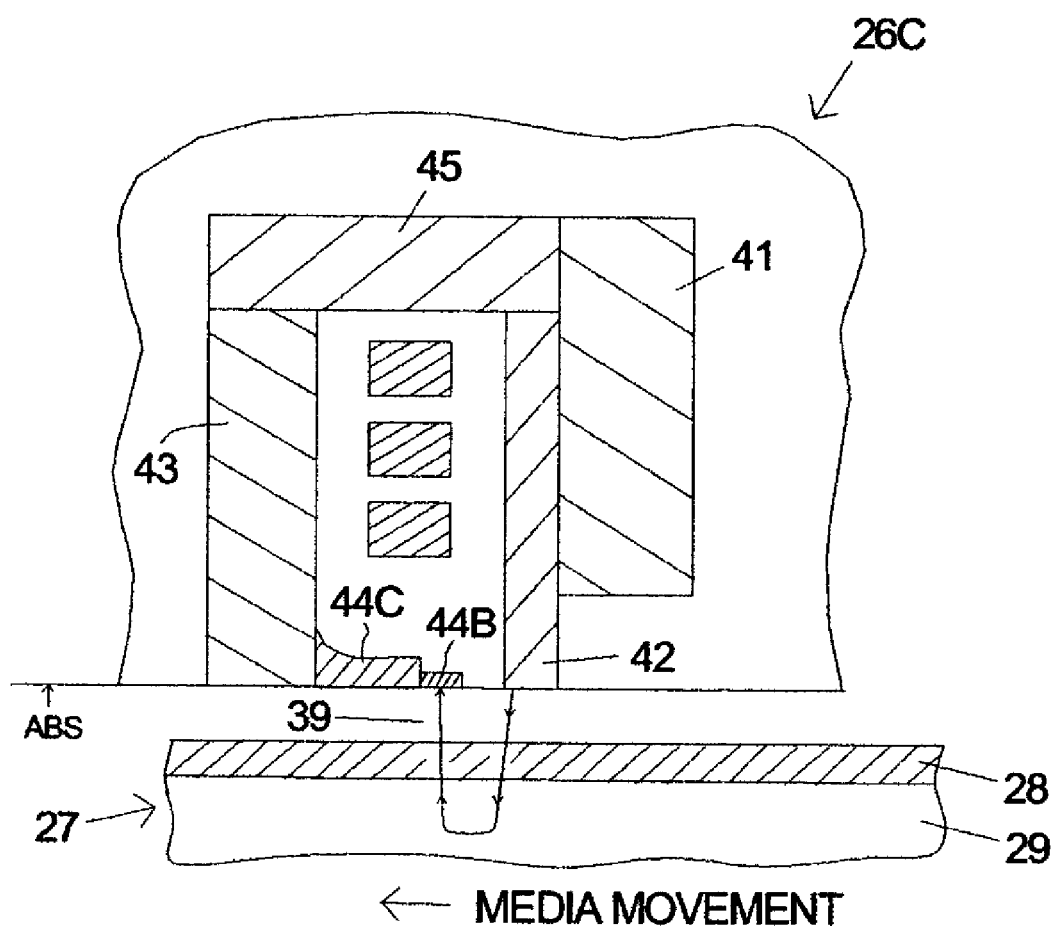
FIG. 6 is a symbolic illustration of a section of a recording head according to a third embodiment of the invention which includes a notched trailing shield with a curved stitch region where the trailing shield attaches to the return pole piece. The section taken is perpendicular to the air-bearing surface for a top or plan view. The media for perpendicular recording is included in the view to aid in describing the functioning of the head.

FIG. 6 illustrates a head 26C with a trailing shield pedestal 44C that has a curved surface where it is stitched to the return pole piece 43. A curved trailing shield pedestal is preferred. If the coil is fabricated first and protected with hard-bake, the shield stitch will be curved as a result of the shrinkage of the hard-bake.

Figure 7:
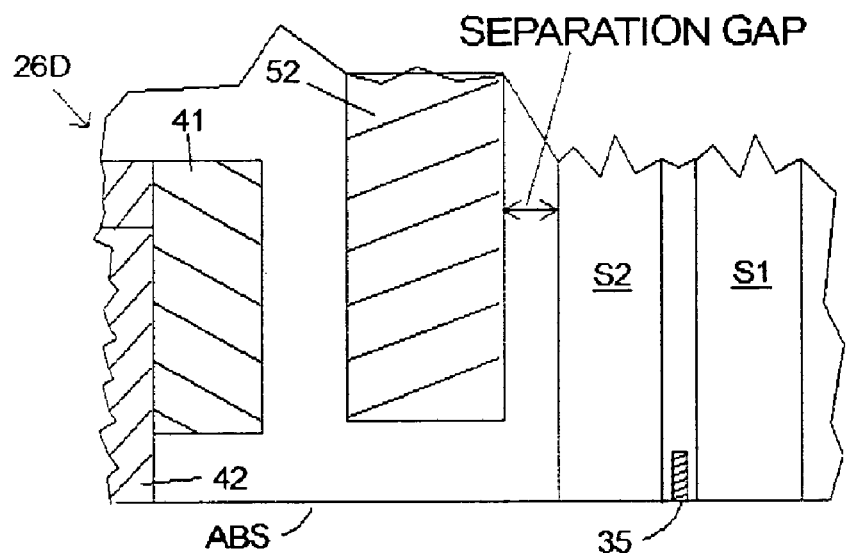
FIG. 7 is a symbolic illustration of a section of a recording head embodiment of the invention which includes a heat sink/shield between the read head and the write head. The section taken is perpendicular to the air-bearing surface for a top or plan view.

Sliders with any of the embodiments of the write head described above can have the read head fabricated first or second. In turn this means that in operation in a storage device, a point on the recording media can pass under the read head first or the write head first depending on the design option. If the read head is fabricated after the write head, the S1 shield will be adjacent to the return pole piece 43 which causes no particular problems. However, if the read head is fabricated first as in head 26D shown in FIG. 7, the S2 shield will be adjacent to the flux carrying pole piece 41. A potential problem with embodiments with the main pole (or writing pole) adjacent to the sensor shields and only one coil is that there will be some unwanted field between the sensor shields and the soft underlayer of the medium. In addition, the total flux between the shields and the soft underlayer adds to the flux from the main pole in terms of what total flux must be returned from the soft underlayer to the return pole, thus increasing the undesirable field at the return pole which might erase data if it is too large. In order to allow this simple geometry to work, the distance between the main pole and the sensor shields is made large enough that the magneto-motive force at the shields will be less than about 10 percent of that at the main pole, and thus the undesired field at the sensor will be less than 10% of the write field. This design rule is met when the reluctance between the main pole and the shields is approximately nine times or more than the reluctance between the shields and the soft underlayer. In a coarse approximation, the reluctance between two magnetic elements which are substantially parallel is the distance between them divided by the area of overlap of the elements. Thus, the distance between the main pole and the shields should be greater than nine times the head-to-underlayer spacing times the length of main pole yoke times half the width of the main pole yoke at the back gap divided by the product of the width of the sensor shields at the air-bearing-surface and the thickness of those shields. The upper limit on that thickness is set by concerns that the distance between write and read heads not be so large that other problems arise such as lithographic misalignment between the read and write heads. In other words, the thickness should be chosen to be no larger than required to meet the reluctance requirement just stated.

The writing pole pieces also generate more local heat than the return pole piece. Therefore, it is preferable to include a heat sink 52 in the read/write separation gap between the S2 and pole piece 41. The heat sink 52 is a non-magnetic, electrically conductive material, preferably copper, and can also be used as part of a lead connection, i.e., part of an electrical path from a component in the head such as the read sensor to a pad on a surface of the head. Although the heat sink can extend to the ABS, preferably it does not extend to the ABS to avoid potential smearing problems. FIG. 5 shows the heat sink 52 as a dashed-line, since it does not extend to the ABS in this embodiment. The sink preferably extends beyond the edges of the coil. In the cross-track direction the heat sink is approximately the same width as the S2 shield. Except for being recessed from the ABS, the heat sink preferably has approximately the same outline as S2 when viewed parallel to the track-line.

The invention has been described with respect to particular embodiments, but other uses and applications for the ferromagnetic structure according to the invention will be apparent to those skilled in the art.

What is claimed is:

1. A thin film magnetic recording head for perpendicular recording using magnetic media with a soft underlayer comprising:
    a yoke that includes a flux bearing pole piece, a main pole piece that is attached to the flux bearing pole piece and extends to an air-bearing surface, and a return pole piece that extends to an air-bearing surface;
    a coil that passes through the yoke between the main pole piece and the return pole piece;
    a trailing shield connected to the return pole piece and extending along the air-bearing surface toward the main pole piece, the trailing shield confronting the main pole piece to form a write gap with a length along the air-bearing surface that is less than a thickness of the coil between the main pole piece and the return pole piece; and
    a read head with first and second read shields with the second read shield being separated from the flux bearing pole piece by a separation gap, the separation gap between the main pole piece and the second read shield being selected to result in a reluctance between the main pole and the second read shield that is substantially larger than a predetermined reluctance between the second read shield and the soft underlayer.

2. The thin film magnetic recording head of claim 1 wherein the reluctance between the main pole and the second read shield that is approximately nine times or more larger than a predetermined reluctance between the second read shield and the soft underlayer.

3. The thin film magnetic recording head of claim 1 wherein the separation gap is approximately nine times or more a predetermined air-bearing surface to soft underlayer spacing times a length of a main pole yoke times half a width of the main pole yoke at a back gap divided by a product of a width of the first and second read shields at the air-bearing-surface and a thickness of the first and second read shields.

4. The thin film magnetic recording head of claim 1 wherein a sink of non-magnetic, electrically conductive material is disposed in the separation gap.

5. The thin film magnetic recording head of claim 4 wherein the sink is recessed from the air-bearing surface.

6. The thin film magnetic recording head of claim 4 wherein the sink has a width in a cross-track direction that is approximately equal to a width of the second shield in the cross-track direction.

7. The thin film magnetic recording head of claim 4 wherein the sink is copper.

8. The thin film magnetic recording head of claim 4 wherein the sink is part of an electrical path from a component in the head to a pad on a surface of the head.

9. The thin film magnetic recording head of claim 1 wherein the trailing shield has a curved stitch-region where the trailing shield attaches to the return pole piece.

10. The thin film magnetic recording head of claim 1 wherein the trailing shield has a straight stitch-region where the trailing shield attaches to the return pole piece.

11. The thin film magnetic recording head of claim 1 wherein the trailing shield has a pedestal portion and a tip portion and the tip portion confronts the main pole piece to form the write gap.

12. A thin film magnetic recording head for perpendicular recording comprising:
    a yoke that includes a main pole piece that extends to an air-bearing surface and a return pole piece that extends to an air-bearing surface;
    a coil that passes through the yoke between the main pole piece and the return pole piece; and
    a trailing shield with a pedestal and a tip, the pedestal being connected to the return pole piece and extending along the air-bearing surface toward the main pole piece, the tip being attached to the pedestal and confronting the main pole piece to form a write gap with a length along the air-bearing surface that is less than a thickness of the coil between the main pole piece and the return pole piece, the tip having a cross-section area orthogonal to the air-bearing surface which is smaller than a cross-section area of the pedestal orthogonal to the air-bearing surface.

13. The thin film magnetic recording head of claim 12 wherein the tip has a cross-track width that is approximately equal to a cross-track width of the main pole piece.

14. The thin film magnetic recording head of claim 12 wherein the tip has a height orthogonal to the ABS that is approximately equal to four times the length of the write gap.

15. The thin film magnetic recording head of claim 12 wherein the pedestal is curved where the pedestal attaches to the return pole piece.

16. The thin film magnetic recording head of claim 12 wherein the pedestal is straight where the pedestal attaches to the return pole piece.

17. The thin film magnetic recording head of claim 12 further comprising:
    a flux bearing pole piece attached to the main pole piece;
    a read head with first and second read shields with the second read shield being separated from the flux bearing pole piece by a separation gap; and
    a sink of non-magnetic, electrically conductive material disposed in the separation gap.

18. The thin film magnetic recording head of claim 17 wherein the sink is part of an electrical path from a component in the head to a pad on a surface of the head.

19. The thin film magnetic recording head of claim 17 wherein the sink is recessed from the air-bearing surface.

20. The thin film magnetic recording head of claim 17 wherein the sink is copper.

21. A thin film magnetic recording head for perpendicular recording comprising:
    a yoke that includes flux bearing pole piece, a main pole piece attached to the flux bearing pole piece that extends to an air-bearing surface and a return pole piece that extends to an air-bearing surface;
    a coil that passes through the yoke between the main pole piece and the return pole piece;
    a trailing shield with a pedestal and a tip, the pedestal being connected to the return pole piece and extending along the air-bearing surface toward the main pole piece, the tip being attached to the pedestal and confronting the main pole piece to form a write gap with a length along the air-bearing surface that is less than a thickness of the coil between the main pole piece and the return pole piece, the tip having a cross-section area orthogonal to the air-bearing surface which is smaller than a cross-section area of the pedestal orthogonal to the air-bearing surface and tip having a cross-track width that is approximately equal to a cross-track width of the main pole piece at the air-bearing surface;
    a read head with first and second read shields with the second read shield being separated from the flux bearing pole piece by a separation gap; and
    a sink of non-magnetic, electrically conductive material disposed in the separation gap.

* * * * *